United States Patent [19]

Lund

[11] Patent Number: 5,886,325
[45] Date of Patent: Mar. 23, 1999

[54] SYSTEM AND METHOD FOR CONTROLLING THE DEGREE OF HEATING EXPERIENCED BY A WORK COIL IN AN INDUCTION HEATING GENERATOR

[75] Inventor: David L. Lund, Minneapolis, Minn.

[73] Assignee: GNB Technologies, Inc., Mendota Heights, Minn.

[21] Appl. No.: 813,233

[22] Filed: Dec. 18, 1996

[51] Int. Cl.⁶ .................................................. H05B 6/04
[52] U.S. Cl. ............................................................. 219/661
[58] Field of Search ................................... 219/660–662, 219/778, 663

[56] References Cited

U.S. PATENT DOCUMENTS

| | | | |
|---|---|---|---|
| 3,610,861 | 10/1971 | Storey et al. | 219/650 |
| 4,015,084 | 3/1977 | Tsumori et al. | 219/665 |
| 4,095,076 | 6/1978 | Tsumori | 219/665 |
| 4,501,943 | 2/1985 | Lund | 219/656 |
| 4,523,068 | 6/1985 | Lund et al. | 219/635 |
| 4,573,260 | 3/1986 | Mullane et al. | 29/623.1 |
| 4,617,442 | 10/1986 | Okuda | 219/663 |
| 4,642,442 | 2/1987 | Mullane et al. | 219/663 |
| 4,661,668 | 4/1987 | Mullane et al. | 29/623.1 |
| 4,717,801 | 1/1988 | Brolin et al. | 219/617 |
| 4,908,489 | 3/1990 | Panecki et al. | 219/625 |
| 5,331,127 | 7/1994 | Chen | 219/661 |
| 5,354,971 | 10/1994 | Chen | 219/661 |
| 5,434,389 | 7/1995 | Griebel et al. | 219/663 |
| 5,748,051 | 5/1998 | Lewis et al. | 331/117 R |

*Primary Examiner*—Teresa Walberg
*Assistant Examiner*—Jeffrey Pwu
*Attorney, Agent, or Firm*—Leydig, Voit & Mayer, LTD

[57] ABSTRACT

An induction heating generator is disclosed. The generator controls the power delivered to a work coil via a plurality of resistor/bias control switches coupled in parallel and a controller, thereby eliminating the expensive and difficult to troubleshoot SCR control circuits associated with prior art generators. By sequentially switching the bias control switches, the controller can progressively lower the input voltage to a controlled switch to thereby alter its conducting state to provide stepped power increases to the work coil. The work coil is de-energized by opening the bias control switches in reverse sequential order.

22 Claims, 4 Drawing Sheets

SYSTEM AND METHOD FOR CONTROLLING THE DEGREE OF HEATING EXPERIENCED BY A WORK COIL IN AN INDUCTION HEATING GENERATOR

FIELD OF THE INVENTION

This invention relates generally to induction heating generators and more particularly to an improved induction heating generator for use in heating a target mass.

BACKGROUND OF THE INVENTION

As explained in detail in U.S. Pat. Nos. 4,501,943 and 4,523,068, which are hereby incorporated by reference, in the manufacture of lead acid storage batteries, it is customary to assemble the individual battery cells into a case with the terminal cells each having an upstanding lead terminal post located at opposed ends of the battery. It is also customary to then position a cover having cylindrical lead bushings fixed therein onto the battery case with the terminal posts extending through respective ones of the bushings, and to thereafter heat, melt, fuse, mold, cool, and freeze the upper ends of the bushings and posts to form the finished battery terminals. Since the case and cover in modern day batteries are commonly made of plastic, care must be taken in fusing the terminal posts and bushings so as not to melt or otherwise damage the immediately adjacent portions of the cover, which can either render the battery defective or sufficiently weaken the seal and support between the cover and bushings as to create leaks or other potentially dangerous conditions during use of the battery.

Prior to the inventions of the '943 and '068 Patents, it was common practice to fuse the terminal posts and bushings by melting the ends thereof by means of an acetylene torch which was manually held and operated. Not only did this procedure fail to lend itself to use in a fully automated battery production line, but the quality and depth of the fused areas of the terminal posts and bushings varied with the operator who performed the fusion process, and even between terminals of successive batteries fused by the same operator since there was no reliable means for controlling the degree of fusion that was effected. Moreover, it was not easily determinable whether minimum required fusion depths were obtained, i.e., generally considered to be between $1/8$ and $3/16$ inch as measured from the top of the finished terminal.

While, prior to the inventions of the '943 and '068 Patents, various proposals had been made for automatically fusing battery terminal posts and cover bushings by means of either acetylene torch heating, electrical resistance heating, or electrical induction heating, such proposals had all faced various drawbacks. For example, these proposals suffered from drawbacks such as the inability to obtain reliable fusion depths within the requisite processing time, undesirable melting of the cover about the bushings, and unacceptable appearance of the finished terminals. Since lead oxides contained within the lead bushings tend to float to the surface during melting, under some circumstances unsightly irregularities in the surfaces of the finished battery terminals had resulted.

The inventions of the '943 and '068 Patents overcame these problems by providing an induction heating apparatus and method for automatically fusing battery terminals. In practicing the inventions of the '943 and '068 Patents, high-power RF induction heating generators have typically been employed. These generators have often utilized a three-phase SCR power control circuit to control the power supplied to the induction coils by the generator. In practice, however, the SCR control circuits of these prior art generators have been prone to failure. Indeed, approximately 80%–90% of the downtime associated with the induction heating generators employing these SCR control circuits is attributable to failures in those SCR control circuits. Such failures have resulted in increased maintenance costs in terms of personnel time and additional economic losses in terms of decreased production due to machine downtime. Other drawbacks of these SCR control circuits include their cost (typically on the order of $3,500.00 per unit) and the inherent difficulty involved in troubleshooting these complicated devices.

On occasion, three phase thyratron tube networks have been used instead of SCR control circuits to control the power supplied to the work coils of the generator. However, these thyratron tube networks have suffered drawbacks similar to those described above. Specifically, such thyratron tube networks are expensive; are prone to failure; are difficult to troubleshoot; and require high maintenance.

Another prior art alternative to using SCR control circuits in induction heating generators is effected by switching the power supplied to the induction coils between fully on and fully off by selectively opening and closing the large, three phase, mechanical plate contactor provided in the induction heating generator. Although, due to its simplicity, this approach is relatively inexpensive and easy to troubleshoot, it suffers from certain other drawbacks. For example, since in order to implement this alternative the plate contactor must be opened and closed under full load, the plate contactor experiences considerable stress and wear, thus, requiring a high degree of maintenance. More significantly, as taught by U.S. Pat. Nos. 9,501,943 and 4,523,068, when fusing battery terminals it is advantageous to provide a controlled de-energization of the induction heating coils over a predetermined time period in order to obtain a good surface appearance of the completed battery terminals. In such instances, it is also advantageous to provide a controlled energization of those coils over a predetermined time period in the form of a relatively linear ramped-up or stepped-up current supply. However, opening and closing the plate contactor to regulate power cannot provide either a controlled energization or a controlled de-energization. On the contrary, it has only two power states, namely, fully on and fully off, and the transitions therebetween are abrupt.

OBJECTS OF THE INVENTION

It is, therefore, a general object of the invention to provide an improved induction heating apparatus and method for fusing battery cell terminal posts and bushings of lead acid storage batteries. More specifically, it is an object of the invention to provide an improved induction heating generator of the foregoing type which does not suffer from the drawbacks associated with SCR control circuits and thyratron tube networks but which nonetheless enjoys the controlled energization and de-energization capabilities typically associated with those devices. It is a related object to provide such a generator which does not employ either an SCR control circuit or a thyratron tube network, but which still provides controlled energization and controlled de-energization of the serviced induction coils. It is another related object to provide such a device wherein the current supplied to the induction coils is increased and decreased over a predetermined time period in a substantially linear, stepped fashion.

It is another object of the invention to provide an improved induction heating generator as characterized above which is more reliable and less expensive than prior art generators. It is a related object to provide such an induction heating generator which is easier to troubleshoot and easier to maintain than prior art devices. It is another related object to provide such a generator which minimizes the stress on the plate contactor by opening and closing the plate contactor when it is not under full load.

It is still another object of the invention to provide an improved induction heating generator of the above kind which is safer to operate than prior art devices. It is a related object to provide such a device wherein the work coils are de-coupled from the power supply when not in use.

SUMMARY OF THE INVENTION

The present invention accomplishes these objectives and overcomes the drawbacks of the prior art by providing an induction heating generator comprising an input port for connecting the generator to a power source, power conditioning circuitry, and a contactor arranged to selectively couple the input port to the power conditioning circuitry. The generator is further provided with a work coil for generating heat, an oscillating circuit for energizing the work coil, and a first controlled switch for energizing the oscillating circuit. The first controlled switch includes a first terminal, a second terminal, and an input terminal for regulating current flow between the first and second terminals. In one preferred embodiment, the induction heating generator also includes a plurality of resistors connected in parallel between the input terminal and the first terminal of the first controlled switch, and a plurality of bias control switches. Each of the bias control switches are connected in series with a respective one of the plurality of resistors, and each has a conducting state and a non-conducting state. In the preferred embodiment, the induction heating generator is further provided with a controller for selectively switching the bias control switches between their conducting and non-conducting states.

These and other features and advantages of the invention will be more readily apparent upon reading the following description of the preferred embodiment of the invention and upon reference to the accompanying drawings wherein:

DESCRIPTION OF A PREFERRED EMBODIMENT

Figure 1:
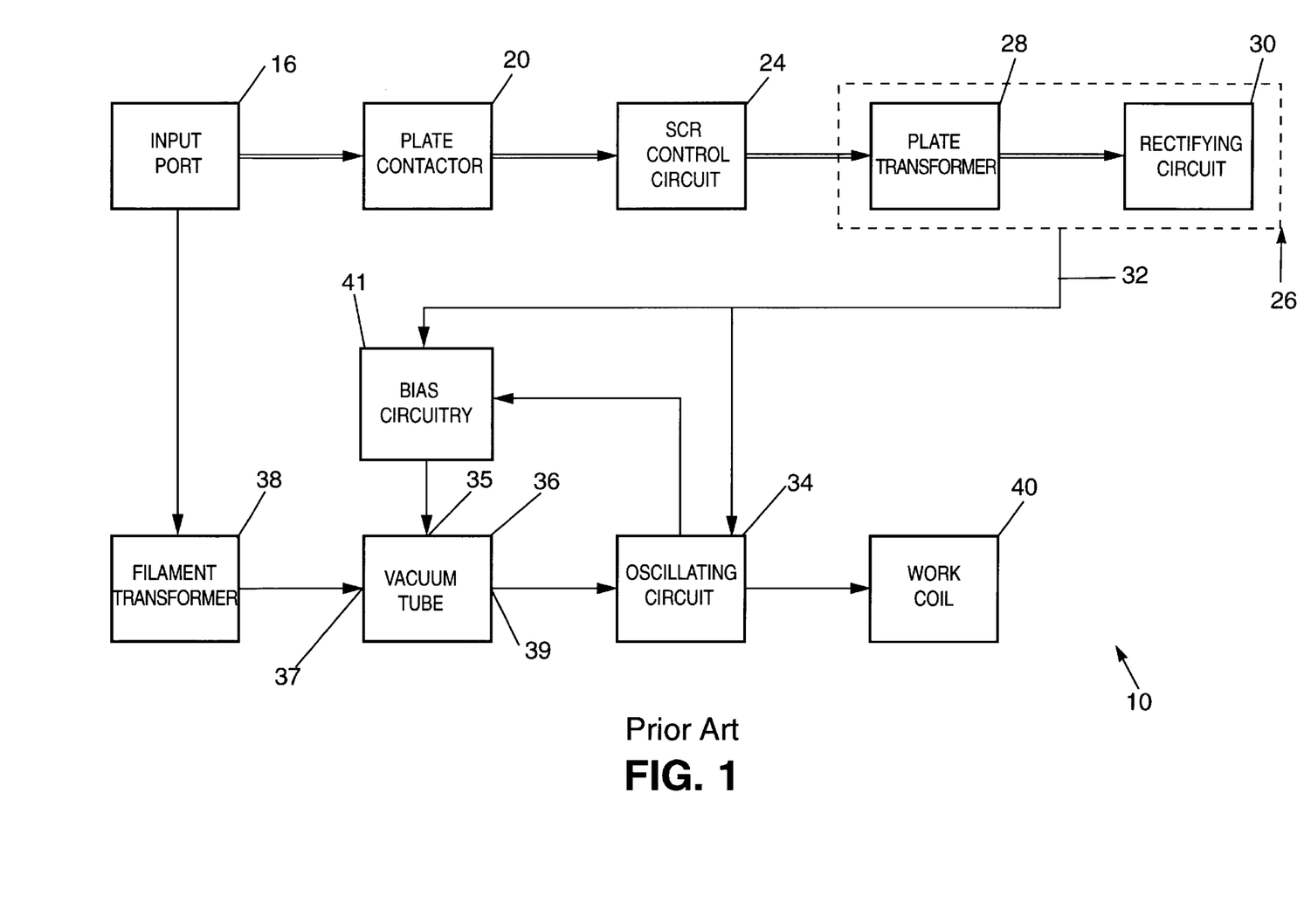
FIG. 1 is a schematic illustration of a prior art induction heating generator.

A representative prior art induction heating generator 10 is illustrated in FIG. 1. As discussed above, such prior art generators are adapted to controllably power a work coil when fusing battery terminals or the like. As also explained above, such prior art generators 10 typically employ an SCR control circuit 24 to control the power supplied to the coil 40.

To this end, the induction heating generator 10 is provided with an input port 16 for coupling the generator 10 to a commercial power supply. A three phase power supply is typically employed in this role. Thus, although it will be understood throughout this discussion that a three phase supply is preferably being employed and that three conductors are utilized to channel power from the input port 16 through the rectifying circuit 30 discussed below, for simplicity of explanation, these connections will be discussed as a single conductor and have been illustrated by a double lined arrow in the drawings. Nonetheless, those skilled in the art will appreciate that, although the present invention is illustrated in the context of a three phase supply, it is equally applicable to instances and applications where single phase power supplies are employed.

In any event, for the purpose of selectively transferring the power received at the input port 16 to the other components of the generator 10, the device 10 is provided with a three-phase plate contactor 20. This plate contactor 20 is a three-phase mechanical device which can be opened or closed to respectively break or complete an electrical connection between the input port 16 and the SCR control circuit 24.

As mentioned above, the SCR control circuit 24 regulates the amount of power supplied to the induction coil 40. Specifically, the SCR control circuit 24 is arranged to receive each phase of the three phase power signal and to control the amount of power passed in each of those phases. By suitable programming, the SCR control circuit 24 can be arranged to vary the amount of power it passes during the energizing and de-energizing processes so that both energization and de-energization of the work coil 40 is achieved in a controlled fashion. Typically, the SCR control circuit 24 is programmed such that the energization and de-energization of the work coil 40 is accomplished in a substantially linear fashion and such that the work coil 40 is energized at a predetermined maximum power level for a predetermined length of time. However, the SCR control circuit 24 generally causes approximately a 5% loss in the power it receives thereby reducing the amount of power actually available to the work coil 40.

To provide a signal suitable for generating sufficient heat to fuse battery terminals to bushings, the generator 10 is further provided with power conditioning circuitry 26. The power conditioning circuitry 26 typically includes a plate transformer 28 for stepping-up the voltage levels of power signals received from the SCR control circuit 24 to a higher level. It also includes a rectifying circuit 30 for rectifying the output of the plate transformer 28 to a DC signal. The rectified signal from the power conditioning circuitry 26 is output via a conductor 32 to an oscillating circuit 34 which is both connected to bias circuitry 41 and inductively coupled to the work coil 40.

For the purpose of driving the oscillating circuit 34 which will, in turn, energize the work coil 40 to thereby inductively heat and/or melt the target mass in or near the work coil 40, the generator 10 is provided with a vacuum tube 36. As shown in FIG. 1, the filament 37 of the vacuum tube 36 is connected to the very high-voltage DC source 32 and to a floating low voltage AC source supplied via a filament transformer 38. The filament 37 is the source of approximately 90% of the electrons passed by the vacuum tube 36 to the oscillating circuit 34.

When the grid 35 of the vacuum tube 36 is suitably biased by the bias circuitry 41, the vacuum tube 36 will completely stop and block the flow of electricity from the filament 37 to the plate 39 of the tube 36 and, thus, to the oscillating circuit 34. Under other conditions, current flow through the bias circuitry 41 to the grid 35 will be amplified by the tube 36 to permit current flow from the filament 37 to the plate 39 of the tube 36 and, thus, to the oscillating or tank circuit 34. High frequency AC oscillation of the tank circuit 36 and the work coil 40 is caused by a feedback transformer in the bias circuitry 41 and by the inherent resonant frequency of the tank circuit 36 and work coil 40. Thus, by regulating the amount of power supplied to the oscillating circuit 34, the SCR control circuit 24 can control the amount of current induced in the work coil 40 and, thus, the extent of heating experienced by the target mass in or near that work coil 40.

The oscillations of the oscillating circuit 34 are fed back to the controlled switch 36 via the above-mentioned feedback transformer of the bias circuitry 41 to form a control loop that regulates current flow through the tube 36. The bias circuitry 41 often includes a plurality of resistors connected in parallel which serves to both limit the current to the grid of the tube 36, and to provide a voltage drop between the filament 37 and the grid 39 sufficient to control current flow through the tube 36.

Figure 2:
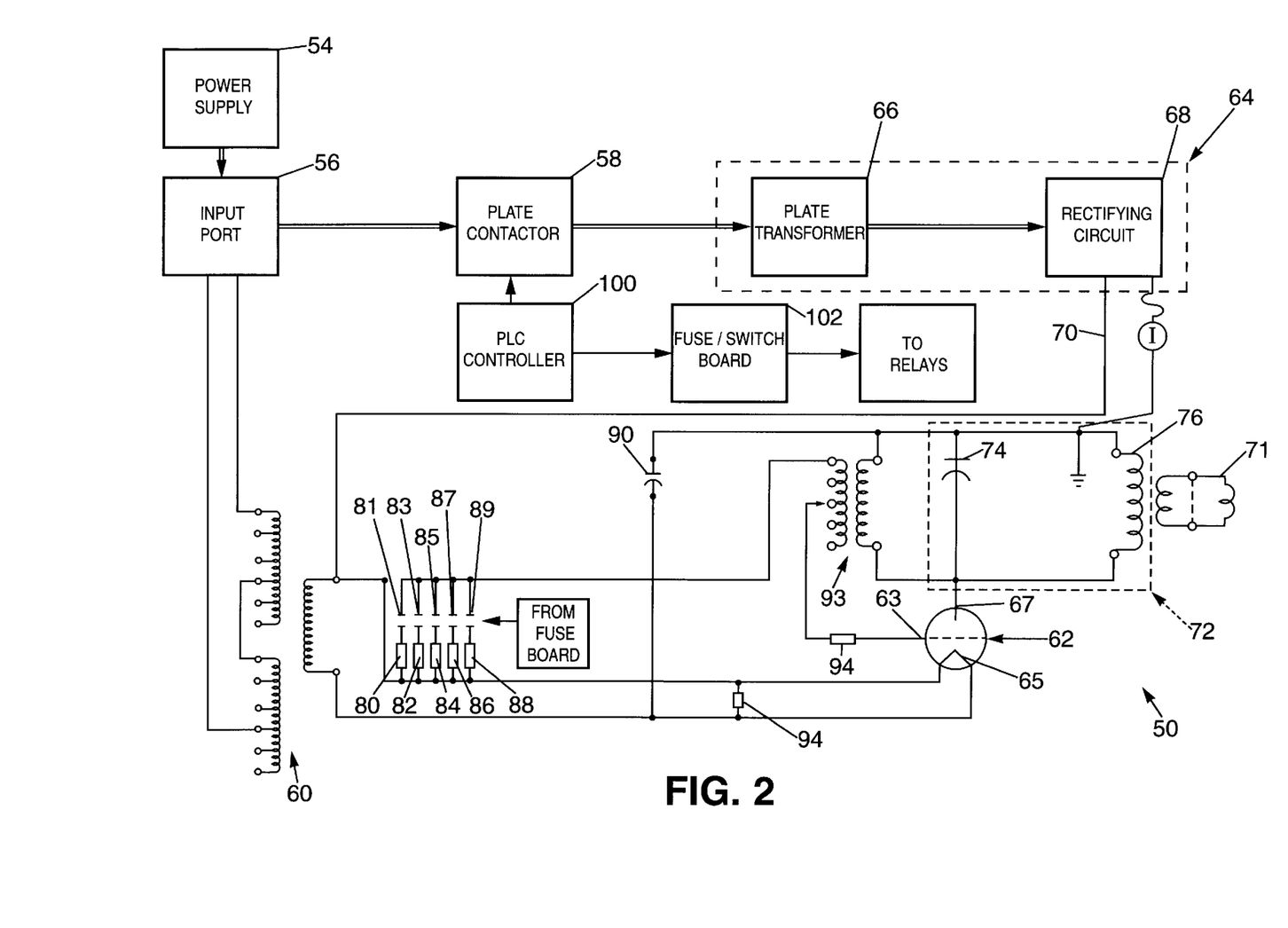
FIG. 2 is a schematic illustration of an induction heating generator constructed in accordance with the teachings of the subject invention.

An induction heating generator 50 constructed in accordance with the teachings of the instant invention is generally illustrated in FIG. 2. As in the prior art generator 10 discussed above in connection with FIG. 1, the inventive generator 50 includes an input port 56 for coupling the generator 50 to a three phase power supply 54. The input port 56 connects the power supply to a plate contactor 58 and to the primary winding of a step down filament transformer 60. The step down filament transformer 60 supplies an AC signal of approximately 6.3 volts. The plate contactor 58 is a large mechanical device for selectively coupling the input terminal 56 to the power conditioning circuit 64.

As in the prior art, the power conditioning circuit 64 comprises a plate transformer 66 and a rectifying circuit 68 which together provide a rectified DC power signal of approximately −10,000 volts on conductor 70.

For the purpose of energizing a work coil 71 through inductive coupling, the generator 50 is provided with an oscillating circuit 72 comprising tank capacitor 74 and inductor 76. The oscillating circuit 72 is coupled to the conditioning circuitry 64 via conductor 69.

For the purpose of driving the oscillating or tank circuit 72 which will, in turn, energize the work coil 71 to thereby inductively heat and/or melt the target mass in or near the work coil 71, the generator 50 is provided with a controlled switch 62, typically in the form of a vacuum tube. As shown in FIG. 2, a first terminal 65 of the vacuum tube 62 (i.e., the filament 65) is connected to the very high voltage DC source 70 and to the floating low-voltage AC source supplied via filament transformer 60. The filament 65 is the source of approximately 90% of the electrons passed by the vacuum tube 62 to the tank circuit 72.

When the control terminal 63 (e.g., the grid 63) of the vacuum tube 62 is suitably biased, the tube 62 will completely stop and block the flow of electricity from the filament 63 to the plate 67 of the tube 62 and, thus, to the tank circuit 72.

In accordance with an important aspect of the invention, means are provided for selectively adjusting the current appearing at the input terminal of the controlled switch. In the preferred embodiment, this means comprises a plurality of resistor/bias control switch pairs coupled in parallel between the filament 65 and the grid 63 of the vacuum tube 62. More specifically, in the preferred embodiment, five resistors 80, 82, 84, 86, 88, each of which is connected in series with a respective bias control switch (preferably implemented by a high voltage relay) 81, 83, 85, 87, 89, are employed in this role.

Selectively closing, then later opening, the high voltage relays (HERs) 81, 83, 85, 87, 89 will control current flow through the grid resistors 80, 82, 84, 86, 88. Current flow through the grid resistors 80, 82, 84, 86, 88 will then be amplified by the tube 62 to permit current flow from the filament 65 to the plate 67 of the tube 62 and then to the tank circuit 72. High frequency AC oscillation of the tank circuit 72 and the work coil 71 will be caused by the feedback transformer 73 of the bias circuitry, and by the inherent resonant frequency of the tank circuit 72 and work coil 71.

As shown diagrammatically in FIG. 2, each of the high voltage relays 81, 82, 85, 87, 89 is individually connected to a controller 100, preferably through a fuse/switch board 102. This controller 100 can be programmed to selectively open and close the relays 81, 83, 85, 87, 89 to controllably vary the voltage drop between the filament 65 and the grid 63 of the vacuum tube 62. By adjusting this voltage drop, the controller 100 can control the conductivity of the controlled switch 62, thereby dictating the amount of current that switch 62 passes to the oscillating circuit 72 and, thus, the degree of heating experienced at the work coil 71.

More specifically, when all of the relays 81, 83, 85, 87, 89 are open, the impedance presented by the array of resistor/relay pairs will be effectively infinite. In other words, since none of the relays 81, 83, 85, 87, 89 are closed, the array of resistor/relay pairs is effectively an open circuit that will not conduct current. By closing one of the relays 81, 83, 85, 87, 89, a corresponding one of the resistors 80, 82, 84, 86, 88 will be connected between the filament 65 and grid 63. Since that resistor has a lower resistance than the open circuit presented when all of the relays 81, 83, 85, 87, 89 are open, the voltage drop between the filament 65 and grid 63 will decrease. If the conducting resistor has a resistance which is sufficient to decrease the voltage drop between the filament 65 and grid 63 by a suitable amount, the vacuum tube 62 will begin to conduct a portion of the AC signal to the oscillating circuit 72. For example, if relay 85 is closed, resistor 84 will be connected in parallel between the filament 65 and the grid 63 of the vacuum tube 62, thereby decreasing the voltage drop between the filament 65 and the grid 63 by an amount dependent upon the resistance of resistor 84.

As those skilled in the art will appreciate, placing resistors in parallel decreases their combined effective resistance in accordance with the formula:

$$\frac{1}{R_{eq}} = \frac{1}{R_1} + \frac{1}{R_2} + \ldots + \frac{1}{R_x}$$

where x equals the number of resistors in parallel. Thus, every time the controller 100 adds another parallel resistor to the array by closing a relay 81, 83, 85, 87, 89, it lowers the effective resistance of the array thereby decreasing the voltage difference between the grid 63 and the filament 65 and increasing the conductivity of the vacuum tube 62. Therefore, by incrementally closing relays 81, 83, 85, 87, 89, the controller 100 can increment the amount of current passed by the vacuum tube 62. Preferably, the resistors 80, 82, 84, 86, 88 are chosen such that, when the controller 100 closes all of the relays 81, 83, 85, 87, 89 and all of the resistors 80, 82, 84, 86, 88 are connected in parallel, the voltage drop between the filament 65 and grid 63 reaches a level such that the vacuum tube 62 is fully conductive and the work coil 71 is fully energized. Also, the resistors are preferably chosen such that when a first one of the relays 81, 83, 85, 87, 89 is closed, the controlled switch 62 will begin to conduct at a level less than its fully conducting state. Closing additional relays will preferably cause the switch 62 to conduct intermediate levels of current until all relays are closed and the fully conducting state is reached.

In accordance with another aspect of the invention, the resistors in the array of resistor/relay pairs are selected to provide a substantially linear energization and de-energization of the work coil 71. More specifically, the individual resistors 80, 82, 84, 86, 88 are selected to have resistances such that, when connected in a predetermined order, the amount of current conducted by the plate 67 of the vacuum tube 62, increases in substantially linear steps. When the resistors are selected in this manner, disconnecting the resistors 80, 82, 84, 86, 88 in reverse order will similarly result in a substantially linear stepped decrease in the current supplied to the oscillating circuit 72. In the preferred embodiment the resistors 80, 82, 84, 86, 88 are selected to have resistances of 10 kilohms, 9.1 kilohms, 8.3 kilohms, 6.7 kilohms and 6.7 kilohms, respectively. Therefore, the effective resistance of all five of the resistors 80, 82, 84, 86, 88 when they are connected in parallel is 1.6 kilohms. However, those skilled in the art will appreciate that resistors of other values could also be employed without departing from the scope of the invention.

In accordance with still another aspect of the invention, means are provided for decreasing the risk of injuries such as electrical shocks to individuals working with or around the generator 50. More specifically, means are provided for de-coupling the work coil 71 from the power supply 54 when the work coil 71 is not in use. In the illustrated embodiment these means are effected by coupling the plate contactor 58 to the controller 100 such that the controller 100 can selectively open and close the plate contactor 58. By suitable programming, the controller 100 is preferably arranged such that it will open the plate contactor 58, thereby separating the work coil 71 from the power supply 54, whenever the generator 50 is not in use. For example, in an assembly line for fusing batteries, the controller 100 will open the contactor 58 between terminal fusions to prevent individuals from inadvertently contacting an energized coil.

The controller 100 is also preferably programmed to only open and/or close the plate contactor 58 when the relays 81, 83, 85, 87, 89 are open. Thus, the plate contactor 58 will only be opened and closed by the controller 100 when the electrical load presented by the generator 50 is at a minimum. By restricting the opening and closing of the plate contactor 58 to instances when its electrical load is at a minimum, the stresses associated with opening and closing the contactor 58 are minimized and the useful life of the plate contactor is greatly extended.

Figure 3A:
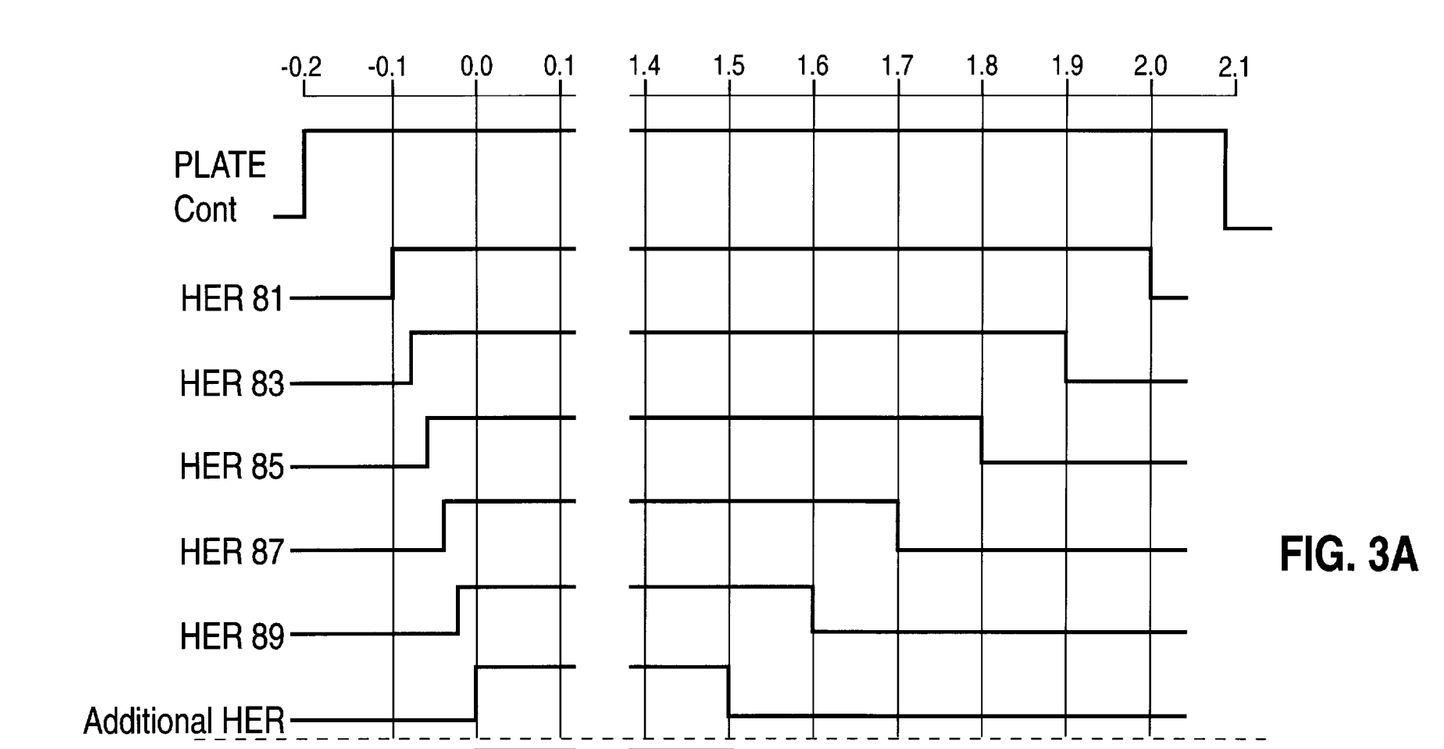
FIG. 3A is a graphical illustration of the on-off states of the high energy relays and plate contactor of the apparatus of FIG. 2 during a representative operation of that apparatus.
Figure 3B:
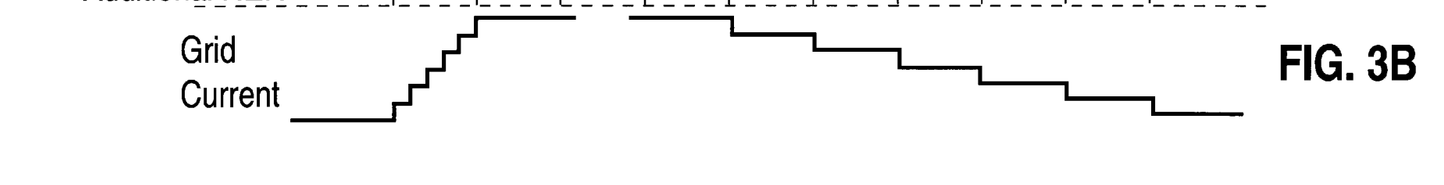
FIG. 3B is a figure similar to FIG. 3A but illustrating the grid current as a result of the representative operation of FIG. 3B when all of the parallel resistors shown in FIG. 2 have the same resistance.

In order to achieve the beneficial effects of controllably energizing and de-energizing the work coil discussed above, the controller 100 is programmed to close and open the relays 81, 83, 85, 87, 89 in a predetermined fashion. Specifically, the controller 100 is programmed to delay a first predetermined length of time between closing each of the relays 81, 83, 85, 87, 89 when energizing the work coil 71, and to wait a second predetermined time between opening each of those relays when de-energizing the coil. Thus, as shown in FIGS. 3A and 3B, in operation the controller 100 first closes the plate contactor 58. After a delay suitable to permit the components of the generator 50 to charge to a steady state condition (preferably 0.1 seconds), the first high voltage relay 81 is closed (at time −0.1 in FIG. 3A). Closing relay 81 lowers the voltage drop between grid 63 and filament 65. The grid current, thus, increases by a first incremental amount (FIG. 3B) which causes the vacuum tube 62 to conduct a first amount of current to the oscillating circuit 72. After a delay of the first predetermined length (in this instance, 0.02 seconds), the controller 100 will close high voltage relay 83 thereby placing resistor 82 in parallel with the resistor 80. As a result of this connection, the grid current will increase by an incremental step and the vacuum tube 62 will proportionally conduct an increased amount of current to the oscillating circuit 72. The controller 100 will continue with this process, namely, sequentially closing relays 85, 87, 89 after intermittent 0.02 second time delays until all of the resistors in the array are connected in parallel. As shown in FIG. 3B, sequentially connecting the resistors in this manner results in a substantially linear stepped increase in the grid current, which will likewise result in a substantially linear stepped increase in the amount of AC current supplied to the oscillating circuit 72 and, thus, to the work coil 71.

After all of the relays 81, 83, 85, 87, 89 are closed, the controller 100 will wait a predetermined amount of time (in the preferred embodiment 1.5 seconds) and then begin to reopen the relays 81, 83, 85, 87, 89 in reverse sequential order to controllably de-energize the work coil 71. As shown in FIG. 3B, the controller delays approximately 0.1 seconds between the opening of each relay to achieve the benefits associated with a controlled de-energization of the work coil 71 discussed above. As shown in FIG. 3A, after the resistors 80, 82, 84, 86, 88 are all de-coupled by their respective relays 81, 83, 85, 87, 89, the controller 100 reopens the plate contactor 58 to ensure that no current is supplied to the work coil 71 when the coil 71 is not in use thereby reducing the risk of injury to personnel working with the generator 50.

The operation of the inventive generator 50 will now be explained in connection with the flowchart illustrated in FIG. 4. Those skilled in the art will appreciate that, although the flowchart illustrates the programmed instructions performed by the controller 100, those programmed instructions can be implemented in many different ways without departing from the scope or the spirit of the invention.

Figure 4:
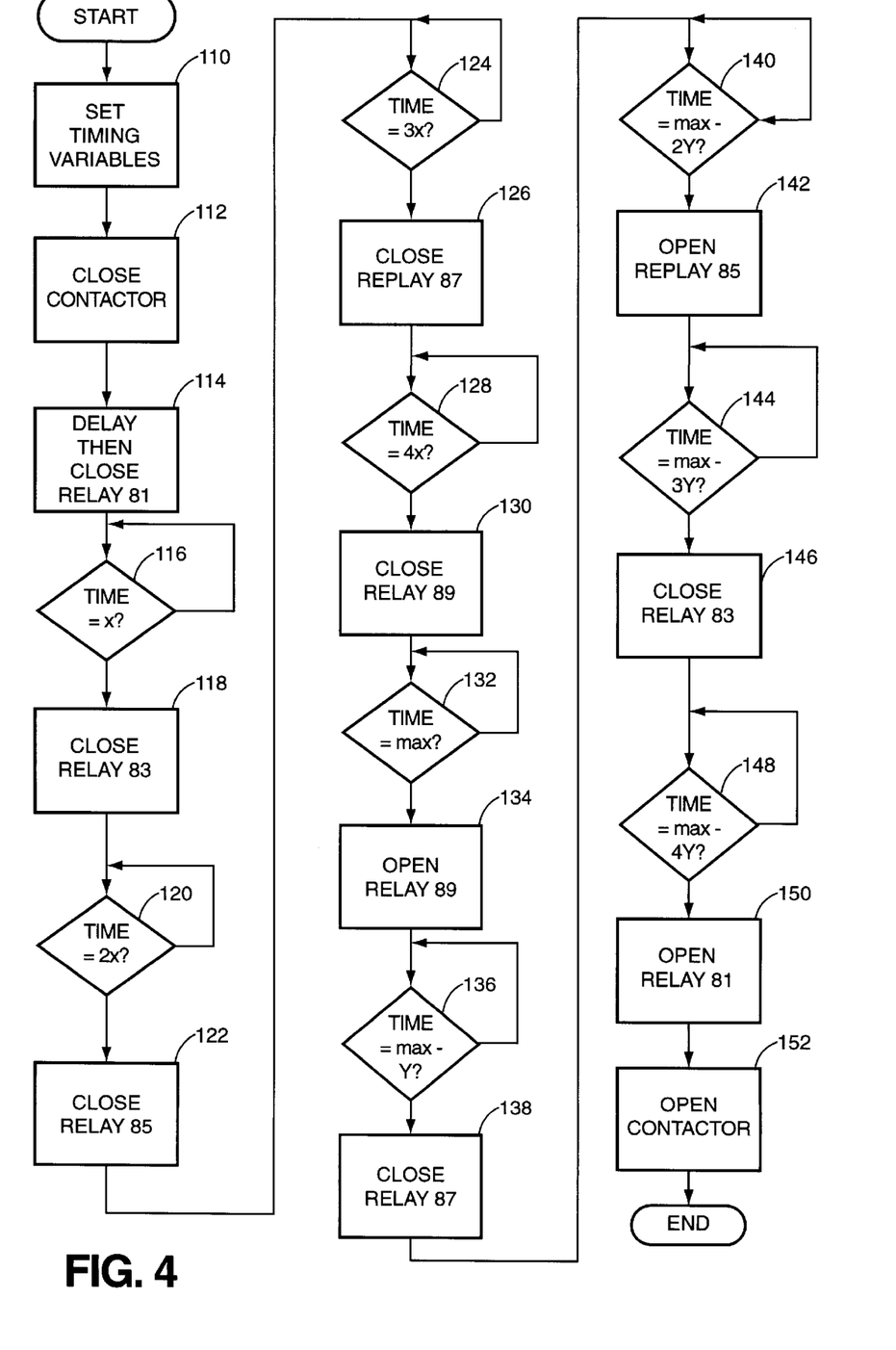
FIGS. 4 is a block diagram representation of some of the steps performed by the controller of the apparatus shown in FIG. 2.

Turning to FIG. 4, the controller 100 initiates an energization cycle by first initializing timing variables which are used to control the timing of the performed operations. The controller 100 then closes the plate contactor 58 (step 112). After a 0.1 second delay to enable the electrical components of the generator 50 to adjust to the newly supplied power, the controller 100 closes relay 81 (step 114). As discussed above, closing relay 81 connects resistor 80 between the grid 63 and the filament 65 of the vacuum tube 62 thereby changing the voltage drop between those two elements and switching the vacuum tube 62 to a conducting state.

After delaying 0.02 seconds (step 116), the controller closes relay 83 (step 118) thereby increasing the amount of current conducted by vacuum tube 62 and, thus, the amount of current present in work coil 71. The controller 100 then continues to sequentially close relays 85, 87, 89 after intermittent delays of 0.02 seconds until all of the resistors 80, 82, 84, 86, 88 are connected in parallel (steps 120–130).

After holding the work coil 71 in a fully energized state for approximately 1.5 seconds (step 132), the controller 100 will then open relay 89 to begin the controlled de-energization of work coil 71 (step 134). After delaying 0.1 seconds (step 136), the controller will open relay 87 (step 138). This process of opening relays 81, 83, 85, 87, 89 after intermittent delays of 0.1 seconds will be repeated in reverse sequentially order until the final relay 81 is opened (step 150). The controller 100 will then complete the energization/de-energization cycle by opening contactor 152.

Although the preferred embodiment employs five resistor/relay pairs to selectively adjust the bias voltage present on the grid 63 of the vacuum tube 62, those skilled in the art will appreciate that any other number of resistor/relay pairs, any number of relays, and/or any number of resistors, can be employed in this capacity without departing from the scope or the spirit of the invention. To illustrate this flexibility, an additional high voltage relay has been depicted in FIGS. 3A and 3B. In addition, although in the preferred embodiment, controller 100 is implemented by a programmable logic controller (PLC), the controller could also be implemented by other suitable devices such as a microprocessor or personal computer, without departing from the scope or the spirit of the invention. Further, although in the preferred embodiment, a vacuum tube is employed to implement controlled switch 62, those skilled in the art will appreciate that other controlled switches could be employed in this role without departing from the invention. For example, solid state switches such as MOSFETs or IGBTs could be employed to implement switch 62. Moreover, although the bias control switches 81, 83, 85, 87, 89 are preferably implemented by relays, other devices such as transistors could also be employed in this role without departing from the invention. Furthermore, although in the preferred embodiment capacitor 92 is a 0.003 mfd capacitor and resistor 94 is a 10 ohm resistor, capacitors and resistors of other sizes could likewise be employed without departing from the invention.

In addition, those skilled in the art will appreciate that, although the subject invention is herein described in the context of a radio-frequency inductive heating generator used to fuse batter terminal posts, the inventive generator is not limited to any particular applications but is readily adaptable to other uses. Finally, although the invention has been described in connection with certain embodiments, it will be understood that there is no intent to in any way limit the invention to those embodiments. On the contrary, the intent is to cover all alternatives, modifications and equivalents included within the spirit and scope of the invention as defined by the appended claims.

What is claimed is:

1. An induction heating generator comprising:

an input port for connecting the generator to a power source;

power conditioning circuitry;

a plate contactor in operative engagement with the input port and the power conditioning circuitry, the contactor being arranged to selectively couple the input port to the power conditioning circuitry;

a work coil for generating heat;

an oscillating circuit for energizing the work coil;

a first controlled switch for energizing the oscillating circuit; the first controlled switch having a first terminal, a second terminal, and an input terminal for regulating current flow between the first and second terminals;

a plurality of resistors connected in parallel between the input terminal and the first terminal of the first controlled switch;

a plurality of bias control switches, each of the bias control switches being connected in series with a respective one of the plurality of resistors, and having a conducting state and a non-conducting state; and, a controller operatively coupled to the bias control switches for selectively switching the bias control switches between their conducting and non-conducting states.

2. An induction heating generator as defined in claim 1 wherein the controller closes the bias control switches sequentially to energize the work coil.

3. An induction heating generator as defined in claim 2 wherein the controller delays a first predetermined time period between closing any two bias control switches during energization of the work coil.

4. An induction heating generator as defined in claim 2 wherein the controller de-energizes the work coil by opening the bias control switches in reverse sequential order with respect to the order in which the bias control switches were closed.

5. An induction heating generator as defined in claim 4 wherein the controller delays a second predetermined time period between opening any two bias control switches during de-energization of the work coil.

6. An induction heating generator as defined in claim 4 wherein the controller delays a third predetermined time period after the last bias control switch is closed before de-energizing the work coil.

7. An induction heating generator as defined in claim 1 wherein the controller is coupled to the plate contactor for selectively coupling the input port to the power conditioning circuitry.

8. An induction heating generator as defined in claim 7 wherein the controller closes the plate contactor before energizing the work coil.

9. An induction heating generator as defined in claim 8 wherein the controller opens the plate contactor after the bias control switches are opened to de-energize the work coil.

10. An induction heating generator as defined in claim 1 wherein the plurality of resistors includes a 10 kilohm resistor, a 9.1 kilohm resistor, an 8.3 kilohm resistor, and two 6.7 kilohm resistors.

11. An induction heating generator as defined in claim 1 wherein the power conditioning circuitry includes a transformer and a rectifying circuit.

12. An induction heating generator ad defined in claim 1 wherein the oscillating circuit comprises a capacitor and an inductor.

13. An induction heating generator as defined in claim 1 further comprising a feedback transformer connected between the oscillating circuit and the input terminal of the controlled switch.

14. An induction heating generator as defined in claim 1 wherein the controlled switch comprises a vacuum tube having a filament, a grid, and a plate, and wherein the first terminal comprises the filament of the vacuum tube, the second terminal comprises the plate of the vacuum tube, and the input terminal comprises the grid of the vacuum tube.

15. An induction heating generator as defined in claim 1 wherein the bias control switches comprise relays.

16. An induction heating generator as defined in claim 1 wherein the controller comprises a programmable logic controller.

17. In an apparatus for fusing a lead battery cell terminal post to a lead bushing in a battery cover comprising: a work coil for generating heat; an input port for connecting the apparatus to a power source; a contactor for selectively coupling the input port to the work coil; power conditioning circuitry; an LC circuit for energizing the work coil; a first controlled switch for energizing the LC circuit; the first controlled switch having a first terminal, a second terminal, and an input terminal for regulating current flow between the first and second terminals; and, a plurality of resistors connected in parallel between the input terminal and the first terminal of the first controlled switch, a method for controlling the current supplied to the work coil comprising the steps of:

provide a plurality of bias control switches, each of the bias control switches being connected in series with a respective one of the resistors in the plurality of parallel resistors for selectively connecting its respective resistor to the input terminal of the first controlled switch; and, selectively closing the bias control switches to control the current flowing between the first and second terminals of the first controlled switch.

18. The method of claim 17 further comprising the step of providing a controller operatively connected to the bias control switches for selectively closing the bias control switches.

19. The method of claim 17 further comprising the step of selectively connecting the apparatus to a power source coupled to the input terminal.

20. The method of claim 19 further comprising the step of providing a controller operatively connected to the contactor for adjusting the operating state of the contactor.

21. An induction heating generator comprising:

an input port for connecting the generator to a power source;

power conditioning circuitry;

a contactor in operative engagement with the input port and the power conditioning circuitry, the contactor being arranged to selectively couple the input port to the power conditioning circuitry;

a work coil for generating heat;

an oscillating circuit for energizing the work coil;

a first controlled switch for energizing the oscillating circuit; the first controlled switch having a first terminal, a second terminal, and an input terminal for regulating current flow between the first and second terminals;

means for selectively adjusting the voltage appearing at the input terminal of the controlled switch to regulate current flow between the first and second terminal; and control means for controlling the operation of the adjusting means.

22. An induction heating generator as defined in claim 21 wherein the control means is coupled to the contactor for selectively coupling the input port to the power conditioning circuitry.

* * * * *